Dec. 14, 1971           H. W. WALLACE           3,626,606
METHOD AND APPARATUS FOR GENERATING A DYNAMIC FORCE FIELD
Filed Nov. 4, 1968           4 Sheets-Sheet 1
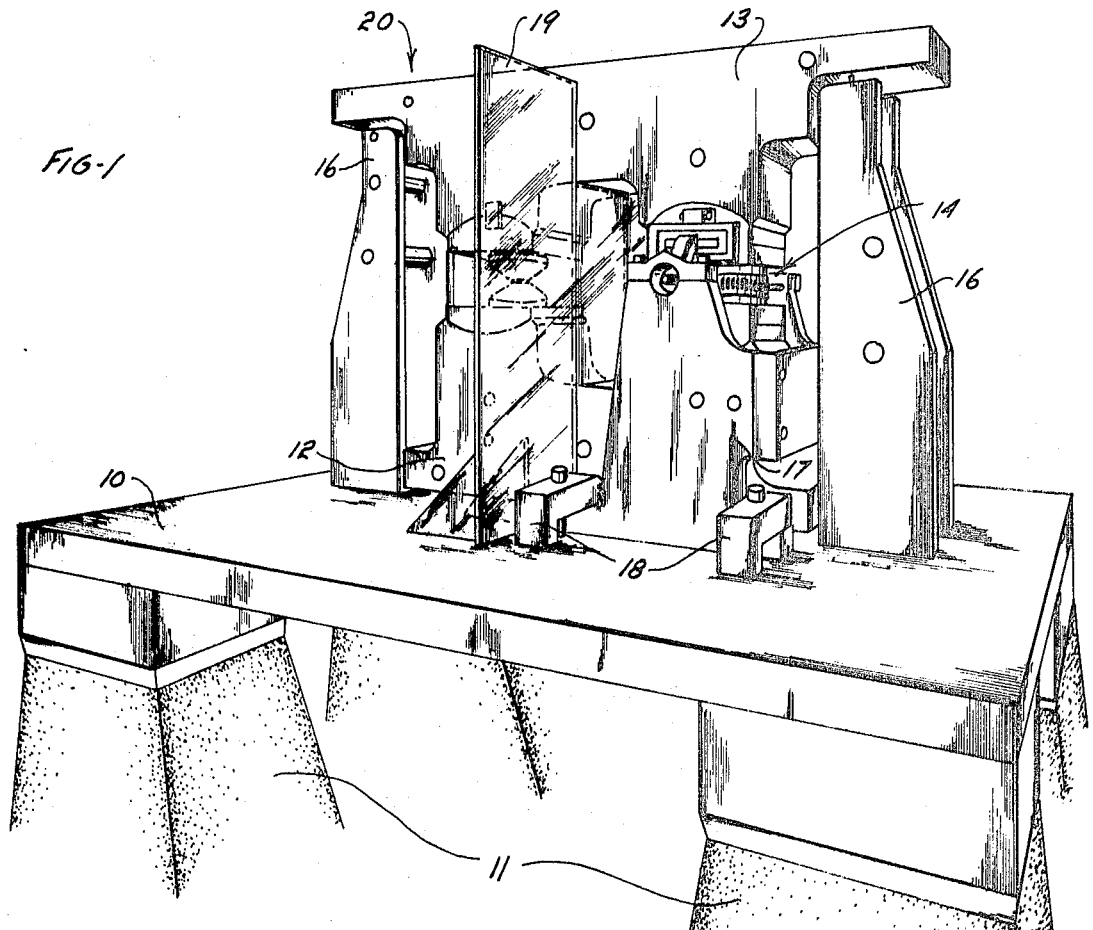
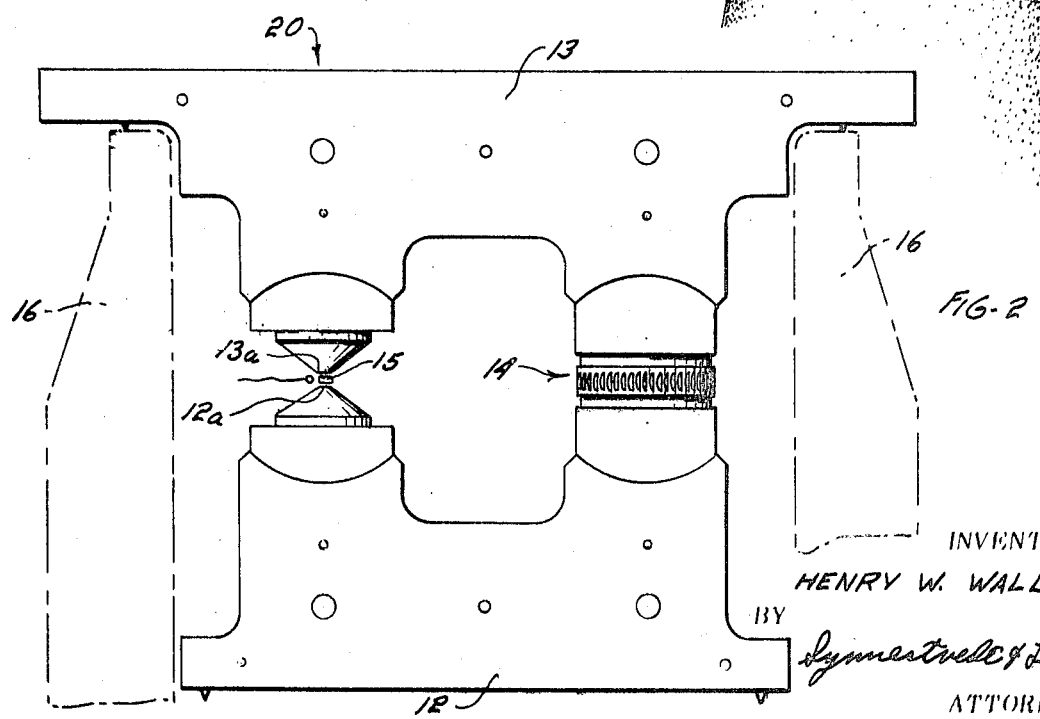
INVENTOR.
HENRY W. WALLACE
BY
ATTORNEYS Dec. 14, 1971  H. W. WALLACE  3,626,606
METHOD AND APPARATUS FOR GENERATING A DYNAMIC FORCE FIELD
Filed Nov. 4, 1968  4 Sheets-Sheet 2
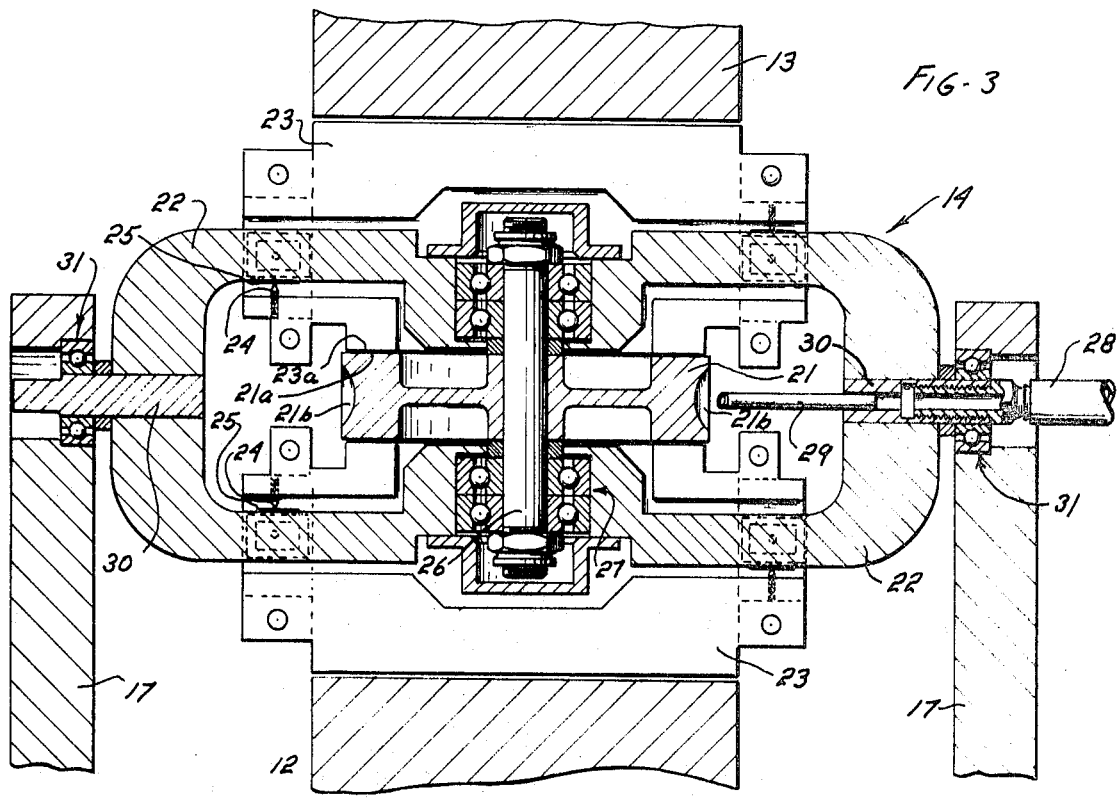
FIG-3
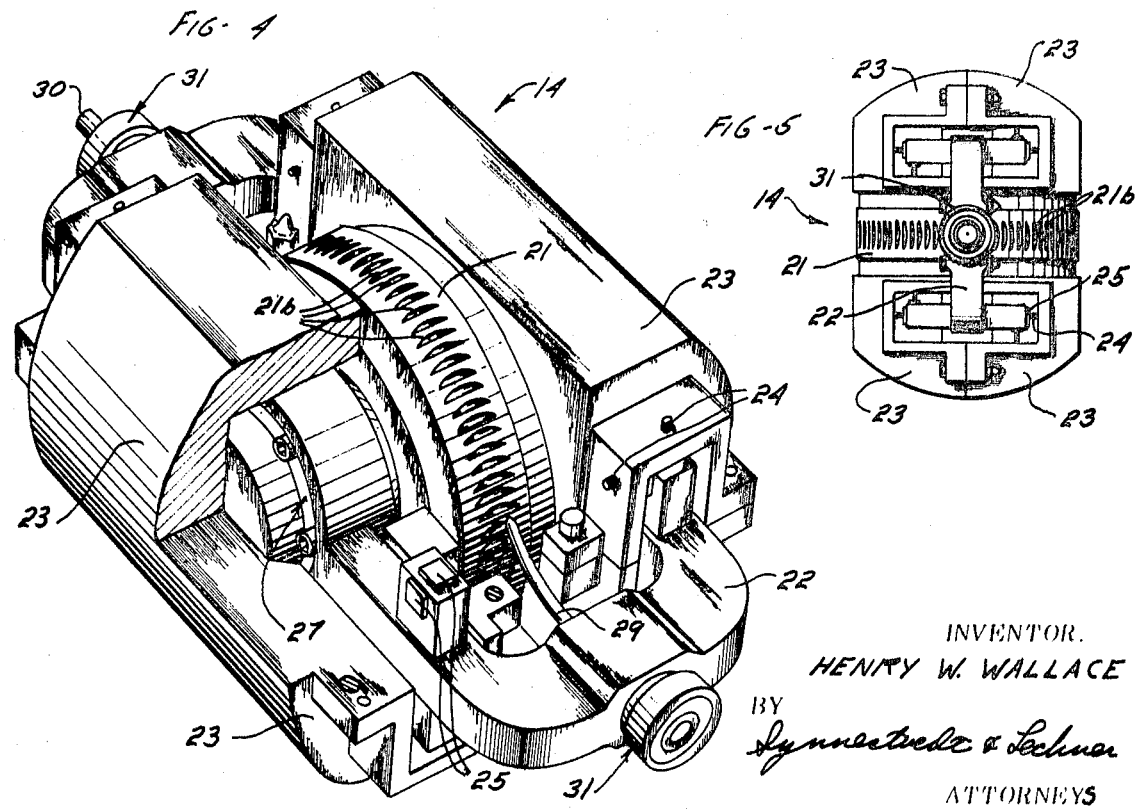
FIG-4
FIG-5
INVENTOR.
HENRY W. WALLACE
BY
Lynnestredt & Lechner
ATTORNEYS

United States Patent Office 3,626,606
Patented Dec. 14, 1971

3,626,606
METHOD AND APPARATUS FOR GENERATING A DYNAMIC FORCE FIELD
Henry W. Wallace, Ardmore, Pa.
(803 Cherry Lane, Laurel, Miss. 39440)
Filed Nov. 4, 1968, Ser. No. 773,116
Int. Cl. G09b 23/06
U.S. Cl. 35—19          10 Claims

ABSTRACT OF THE DISCLOSURE

Apparatus and method for generating a non-electromagnetic force field due to the dynamic interaction of relatively moving bodies through gravitational coupling, and for transforming such force fields into energy for doing useful work.

The method of generating such non-electromagnetic forces includes the steps of juxtaposing in field series relationship a stationary member, comprising spin nuclei material further characterized by a half integral spin value, and a member capable of assuming relative motion with respect to said stationary member and also characterized by spin nuclei material of one-half integral spin value; and initiating the relative motion of said one member with respect to the other whereby the interaction of the angular momentum property of spin nuclei with inertial space effects the polarization of the spin nuclei thereof, resulting in turn in a net component of angular momentum which exhibits itself in the form of a dipole moment capable of dynamically interacting with the spin nuclei material of the stationary member, thereby further polarizing the spin nuclei material in said stationary member and resulting in a usable non-electromagnetic force.

---

This invention relates to an apparatus and method for use in generating energy arising through the relative motion of moving bodies and for transforming such generated energy into useful work. In the practice of the present invention it has been found that when bodies composed of certain material are placed in relative motion with respect to one another there is generated an energy field therein not heretofore observed. This field is not electromagnetic in nature; being by theoretical prediction related to the gravitational coupling of moving bodies.

The initial evidence indicates that this nonelectromagnetic field is generated as a result of the relative motion of bodies constituted of elements whose nuclei are characterized by half integral "spin" values; the spin of the nuclei being synonymous with the angular momentum of the nucleons thereof. The nucleons in turn comprise the elemental particles of the nucleus; i.e., the neutrons and protons. For purposes of the present invention, the field generated by the relative motion of materials characterized by a half integral spin value is referred to as a "kinemassic" force field.

It will be appreciated that relative motion occurs on various levels, i.e., there may be relative motion of discrete bodies as well as of the constituents thereof including, on a subatomic level, the nucleons of the nucleus. The kinemassic force field under consideration is a result of such relative motion, being a function of the dynamic interaction of two relatively moving bodies including the elemental particles thereof. The value of the kinemassic force field, created by reason of the dynamic interaction of the bodies experiencing relative motion, is the algebraic sum of the fields created by reason of the dynamic interaction of both elementary particles and of the discrete bodies.

For a closed system comprising only a stationary body, the kinemassic force, due to the dynamic interaction of the particles therein, is zero because of the random distribution of spin orientations of the respective particles. Polarization of the spin components so as to align a majority thereof in a preferred direction establishes a field gradient normal to the spin axis of the elementary particles. The present invention is concerned with an apparatus for establishing such a preferred orientation and as a result generating a net force component capable of being represented in various useful forms.

Accordingly, the primary object of the present invention concerns the provision of means for generating a kinemassic field due to the dynamic interaction of relatively moving bodies.

A further object of the present invention concerns a force field generating apparatus wherein means are provided for polarizing material portions of the apparatus so as to reorient the spin of the elementary nuclear components thereof in a preferred direction thereby generating a detectable force field.

The kinemassic force field finds theoretical support in the laws of physics, being substantiated by the generalized theory of relativity. According to the general theory of relativity there exists not only a static gravitational field but also a dynamic component thereof due to the gravitational coupling of relatively moving bodies. This theory purposes that two spinning bodies will exert force on each other. Heretofore the theoretical predictions have never been experimentally substantiated however, as early as 1896, experiments were conducted in an effort to detect predicted centrifugal forces on stationary bodies placed near large, rapidly rotating masses. The results of these early experiments were inconclusive, and little else in the nature of this type of work is known to have been conducted.

It is therefore another object of the present invention to set forth an operative technique for generating a measurable force field due to gravitational coupling of relatively moving bodies.

Another more specific object of the present invention concerns a method of generating a non-electromagnetic force field due to the dynamic interaction of relatively moving bodies and for utilizing such forces for temperature control purposes including the specific application of such forces to the control of lattice vibrations within a crystalline structure thereby establishing an appreciable temperature reduction, these principles being useful for example in the design of a heat pump.

The foregoing objects and features of novelty which characterize the present invention as well as other objects of the invention are pointed out with particularity in the claims annexed to and forming a part of the present spection. For a better understanding of the invention, its advantages and specific objects allied with its use, reference should be made to the accompanying drawings and descriptive matter in which there is illustrated and described a preferred embodiment of the invention.

In the drawings:

FIG. 1 is an overall perspective view of equipment constructed according to the present invention, this equipment being designed especially for demonstrating the useful applications of kinemassic force fields;

FIG. 2 is an isolation schematic of apparatus components comprising the kinemassic field circuit of the apparatus of FIG. 1, showing the field series relationship of generator and detector units;

FIGS. 3, 4 and 5 show the generator of FIGS. 1 and 2 in greater detail;

Figure 6:
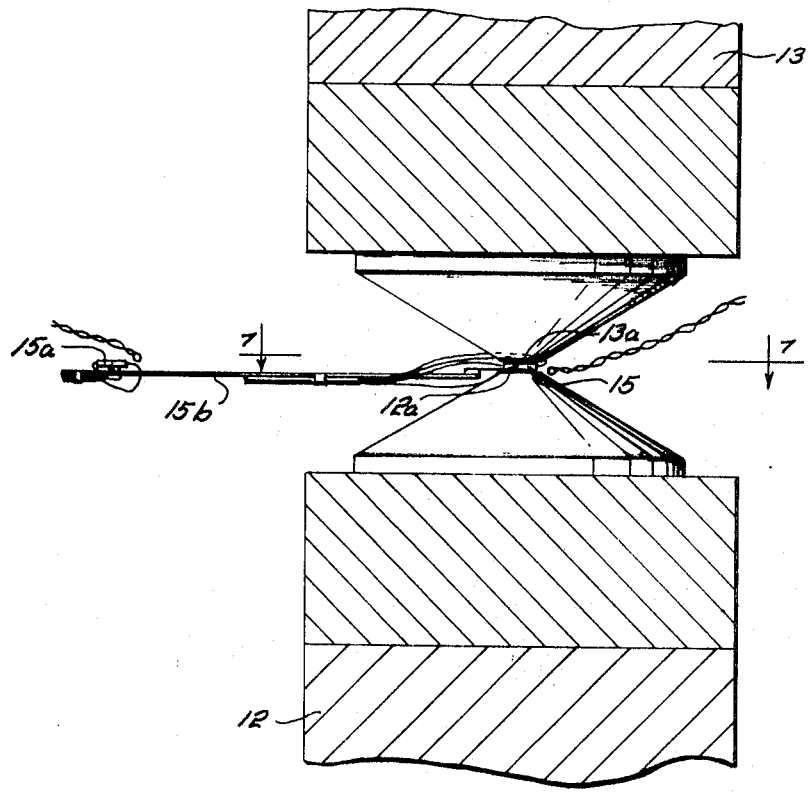
FIG. 6 is an enlarged view of the detector working air gap area of the apparatus of FIGS. 1 and 2.

Before getting into a detailed discussion of the apparatus and steps involved in the practice of the present invention it should be helpful to an understanding of the present invention if consideration is first given to certain defining characteristics many of which bear an analogous relationship to electromagnetic field theory. A first feature is that the kinemassic field is vectorial in nature. The direction of the field vector is a function of the geometry in which the relative motion between mass particles takes place.

The second significant property of the kinemassic field relates the field strength to the nature of the material in the field. This property may be thought of as the kinemassic permeability by analogy to the concept of permeability in magnetic field theory. The field strength is apparently a function of the density of the spin nuclei material comprising the field circuit members. Whereas the permeability in magnetic field theory is a function of the density of unpaired electrons, the kinemassic permeability is a function of the density of spin nuclei and the measure of magnitude of their half integral spin values. As a consequence of this latter property, the field may be directed and confined by interposing into it denser portions of desired configuration. For example, the field may be in large measure confined to a closed loop of dense material starting and terminating adjacent a system wherein relative motion between masses is occuring.

A further property of the kinemassic force field relates field strength to the relative spacing between two masses in relative motion with respect to one another. Thus, the strength of the resultant field is a function of the proximity of the relatively moving bodies such that relative motion occurring between two masses which are closely adjacent will result in the generation of a field stronger than that created when the same two relatively moving bodies are spaced farther apart.

As mentioned above, a material consideration in generating the kinemassic force field concerns the use of spin nuclei material. By spin nuclei material is meant materials in nature which exhibit a nuclear external angular momentum component. This includes both the intrinsic spin of the unpaired nucleon as well as that due to the orbital motion of these nucleons.

Since the dynamic interaction field arising through gravitational coupling is a function of both the mass and proximity of two relatively moving bodies, then the resultant force field is predictably maximized within the nucleus of an atom due to the relatively high densities of the nucleons, both in terms of mass and relative spacing, plus the fact that the nucleons possess both intrinsic and orbital components of angular momentum. Such force fields may in fact account for a significant portion of the nuclear binding force found in all of nature.

It has been found that for certain materials, namely those characterized in a half integral spin value, the external component of angular momentum thereof will be accompanied by a force due to the dynamic interaction of the nucleons. This is the so-called kinemassic force which on a submacroscopic basis exhibits itself as a field dipole moment aligned with the external angular momentum vector. These moments are of sufficient magnitude that they interact with adjacent, or near adjacent spin nuclei field dipole moments of neighboring atoms.

This latter feature gives rise to a further analogy to electromagnetic field theory in that the interaction of adjacent spin nuclei field dipole moments gives rise to nuclear domain-like structures within matter containing sufficient spin nuclei material.

Although certain analogies exist between the kinemassic force field and electromagnetic field theory, it should be remembered that the kinemassic force is essentially nonresponsive to or affected by electromagnetic force phenomena. This latter condition further substantiates the ability of the kinemassic field to penetrate through and extend outward beyond the ambient electromagnetic field established by the moving electrons in the atomic structure surrounding the respective spin nuclei.

As in electromagnetic field theory, in an unpolarized sample, the external components of angular momentum of the nuclei to be subjected to a kinemassic force field, are originally randomly oriented such that the material exhibits no residual kinemassic field of its own. However, establishing the necessary criteria for such a force field effects a polarization of the spin components of adjacent nuclei in a preferred direction thereby resulting in a force field which may be represented in terms of kinemassic field flux lines normal to the direction of spin.

The fact that spin nuclei material exhibits external kinemassic forces suggests that these forces should exhibit themselves on a macroscopic basis and thus be detectable, when arranged in a manner similar to that for demonstrating the Barnett effect when dealing with electromagnetic phenomena.

In the Barnett effect a long iron cylinder, when rotated at high speed about its longitudinal axis, was found to develop a measurable component of magnetization, the value of which was found to be proportional to the angular speed. The effect was attributed to the influence of the impressed rotation upon the revolving electronic systems due to the mass property of the unpaired electrons within the atoms.

In the apparatus constructed in accordance with the foregoing principles it was found that a rotating member composed of spin nuclei material exhibits a kinemassic force geld. The interaction of the spin nuclei angular momentum with inertial space causes the spin nuclei axes of the respective nuclei of the material being spun to tend to reorient parallel with the axis of the rotating member. This results in the nuclear polarization of the spin nuclei material. With sufficient polarization, an appreciable field of summed dipole moments emanates from the wheel rim flange surfaces to form a secondary dynamic interaction with the dipole moments of spin nuclei contained within the facing surface of a stationary body positioned immediately adjacent the rotating member.

When the stationary body, composed of suitable spin nuclei material, is connected in spatial series with the rotating member, a circuitous form of kinemassic field is created; the flux of which is primarily restricted to the field circuit.

Having now further defined the substantiating theory giving rise to the kinemassic forces operative in the present invention, reference is now made to the aforementioned drawings depicting in general an apparatus embodying the defining characteristics outlined above.

From the foregoing discussion, it will be appreciated that for both the purpose of detecting and exploiting the kinemassic field, several basic apparatus elements are necessary. First, apparatus is needed to enable masses to be placed in relative motion to one another. In order to maximize field strength the apparatus should be capable of generating high velocities between the particles in relative motion. Furthermore, the apparatus should be configured so that the proximity of the particles which are in relative motion is maximized. The necessity of using relatively dense material comprising half integral spin nuclei for the field circuit has already been stressed. These and other features are discussed in greater detail below in explanation of the drawings depicting an implementation of the invention, primarily for detection of the kinemassic field.

In considering the drawings, reference will first be made to the general arrangement of components, as particularly shown in FIGS. 1 and 2. As viewed in FIG. 1, the equipment is mounted upon a stationary base comprising a horizontal structure element 10 which rests upon permanent pilings of poured concrete 11 or other suitable structurally rigid material. It should be made clear at the outset that the stationary base although not a critical element in its present form nevertheless serves an important function in the subject invention. Thus, the stationary base acts as a stabilized support member for mounting the equipment and, perhaps more significantly, the horizontal portion thereof is of such material that it tends to localize the kinemassic force field to the kinemassic force field generating apparatus proper. This latter feature is discussed in more detail below. The surface uniformity of the horizontal structural element 10 also facilitates the alignment of equipment components. In the reduction to practice embodiment of the present invention a layer of shock absorbing material (not shown) was interposed beneath the stationary base and the floor.

Shown mounted on the horizontal structural element 10 is the kinemassic force field generating apparatus indicated generally as 20, the lower portion of which is referred to as the lower mass member 12. An upper mass member 13 is positioned in mirrored relationship with respect to member 12 and separated somewhat to provide two air gaps therebetween. The lower and upper mass members 12 and 13 function as field circuit members in relationship to a generator 14 and a detector 15 positioned within respective ones of said two gaps. The spatial relationship of the generator, the detector and the mass members is such as to form a kinemassic force field series circuit.

All of the material members of the field circuit are comprised of half integral spin material. For example the major portion of the generator 14, and the upper and lower mass members 13 and 12, respectively, are formed of a particular brass alloy containing 89% copper, of which both isotopes provide a three-halves proton spin, 10% zinc, and 1% lead, as well as traces of tin and nickel. The zinc atom possesses one spin nuclei isotope which is 4.11% in abundance and likewise the lead also contains one spin nuclei isotope which is 22.6% in abundance. In order to gain an estimate of apparatus size, the upper circuit member has an overall length of 56 centimeters and a mass of 43 kilograms.

It will be seen that the constituents of the mass members are such as satisfy the criteria of half integral spin nuclei material for those apparatus parts associated with the field and the use of non-spin nuclei material for those parts where it is desired to inhibit the field. Accordingly, all support or structural members, such as the horizontal structural element 10, consist of steel. The iron and carbon nuclei of these structural members are classed as no-spin nuclei and thus represent high relative reluctance to the kinemassic field. Supports 16 are provided to accommodate the suspension of the upper mass member 13. The supports 16 are of steel the same as the horizontal support element 10. The high relative reluctance of steel to the kinemassic field minimizes the field flux loss created in the field series circuit of mass members 12 and 13, the generator 14, and the detector 15. The loss of field strength is further minimized by employing high-reluctance isolation bridges at the points of contact between the lower and upper mass members 12 and 13, and the structural support members 10 and 16.

Shunt losses within the apparatus were, in general, minimized by employing the technique of minimum mass contact; the use of low field permeability material at the isolation bridges or structural connections; and avoiding bulk mass proximity.

A number of techniques were developed for optimizing the isolation bridge units including Carboloy cones and spherical spacers. As is depicted more clearly in FIGS. 3, 4 and 5, the structural connection unit ultimately utilized consisted of a hardened 60° steel cone mounted within a setscrew and bearing against a hardened steel platen. The contact diameter of the cone against the platen measured approximately 0.007 inch and was loaded within elastic limits. Adjustment is made by means of turning the setscrew within a mated, threaded hole.

FIG. 2 is presented in rather diagrammatic form; however, the diagrammatic configuration emphasizes that it consists of a rotatable member corresponding to the generator 14 of FIG. 1 which is "sandwiched" between a pair of generally U-shaped members corresponding to the lower and upper mass members 12 and 13 of FIG. 1. The wheel of generator 14 is mounted for rotation about an axis lying in the plane of the drawing. When member 14 is rotated rapidly with respect to the U-shaped members 12 and 13, a kinemassic field is generated which is normal to the plane defined by the rotating member and within the plane of the drawing.

As such, it may be represented in the drawing of FIG. 2 as taking a generally counterclockwise direction with respect to the field series circuit members.

Referring once more to FIG. 1, it is seen that support for the generator unit 14 is provided by way of a support assembly 17, also fabricated of steel components. The support assembly 17 is in turn clamped to the horizontal structural element 10 by way of bracket assemblies 18.

In the embodiment of the present invention depicted in FIGS. 1 and 2, the lower and upper mass members 12 and 13 are fashioned into conical sections terminating in conical pole faces 12a and 13a in the area of the detector 15. This configuration tends to maximize the flux density in this area.

For isolation purposes, a curtain of transparent plastic material 19 is positioned so as to geometrically bisect the detector portion of the field circuit from the generator portion thereof. The function of the transparent curtain is to provide a degree of thermal isolation between the generator and detector units. Although not actually shown in FIG. 2 the transparent curtain is of H configuration and forms a vertical plane normal to the plane of the drawing and symmetrically positioned with respect thereto.

Not shown in the drawings are a tunnel of transparent material and a film of flexible plastic material which surround the detector 15 and associated equipment and thus serve to further stabilize the temperature conditions, thereby diminishing the adverse effects due to thermal gradients.

Before proceeding with the explanation of the operation of the apparatus disclosed in FIGS. 1 and 2, a more detailed description of certain portions of the structure will be given.

FIGS. 3, 4 and 5 present the generator assembly 14 of FIGS. 1 and 2 in greater detail. In particular, these figures disclose the relationship between a freely rotatable wheel 21, a bearing frame 22, and a pair of pole pieces 23. The bearing frame 22 is of structural steel, and functions to spatially orient the three generator parts without shunting the generated field potential.

Positioning of the generator wheel 21 with respect to the cooperative faces of the pole pieces 23 is effected by way of the bearing frame upon which the generator wheel is mounted. In this respect the high-reluctance isolation bridges mentioned with respect to FIGS. 1 and 2 are herein shown as setscrews 24 which are adjustably positioned to cooperate with hardened steel platens 25. The setscrews 24 are mounted on the pole pieces 23 and are adjustably positioned with respect to steel platens 25 cemented to the bearing frame 22 so as to facilitate the centering of the generator wheel 21 with respect to the interface surfaces 23a of the pole pieces 23.

In the implementation of the present invention the air gap formed between the generator wheel rim flanges and the stationary pole pieces 23 was adjusted to a light-rub relationship when the wheel was slowly rotated; as such this separation was calculated to be 0.001 centimeter for a wheel spin rate of 28,000 revolutions per minute due to the resulting hoop tension. In the drawing of FIG. 3 the spacing between the pole pieces 23 and the generator wheel rim flange has been greatly exaggerated to indicate that in fact such a spacing does exist.

The generator wheel 21 utilized in the implementation of the present invention has an 8.60 centimeter diameter and an axial rim dimension of 1.88 centimeters. The rim flange surfaces 21a which are those field emanating areas closely adjacent the surfaces 23a of the pole pieces 23, are each 29.6 square centimeters. The rim portion of the wheel has a volume of 55.7 cubic centimeters neglecting the rim turbine slots 21b.

The generator wheel 21 and an associated mounting shaft 26 are mounted on the bearing frame 22 by means of enclosed double sets of matched high speed bearings 27.

Compressed air or nitrogen is used to drive the generator wheel by means of gas impingement against turbine buckets 21b cut in the wheel rim. The compressed gas is supplied through the supply line 28 and emanates from the air jet tube 29. Rate of spin is sensed by light rays reflected from the rim. For this purpose every other quadrant on the rim surface was painted black. Accordingly, light directed at the rim of the wheel will be reflected by the unpainted quadrants into light-sensing cells associated with a rate-measuring circuit of conventional design. Since the rate-detecting means form no part of the present invention they have not been depicted in the actual drawing.

Shaft members 30 carry suitable bearing members 31 for rotatably mounting the generator asembly with respect to a second axis. The support assembly 17 of FIG. 1 is partially represented in FIG. 4, and, as noted above it provides the mounting means for positioning the generator assembly 14 with respect to the lower and upper mass members 12 and 13.

Figure 7:
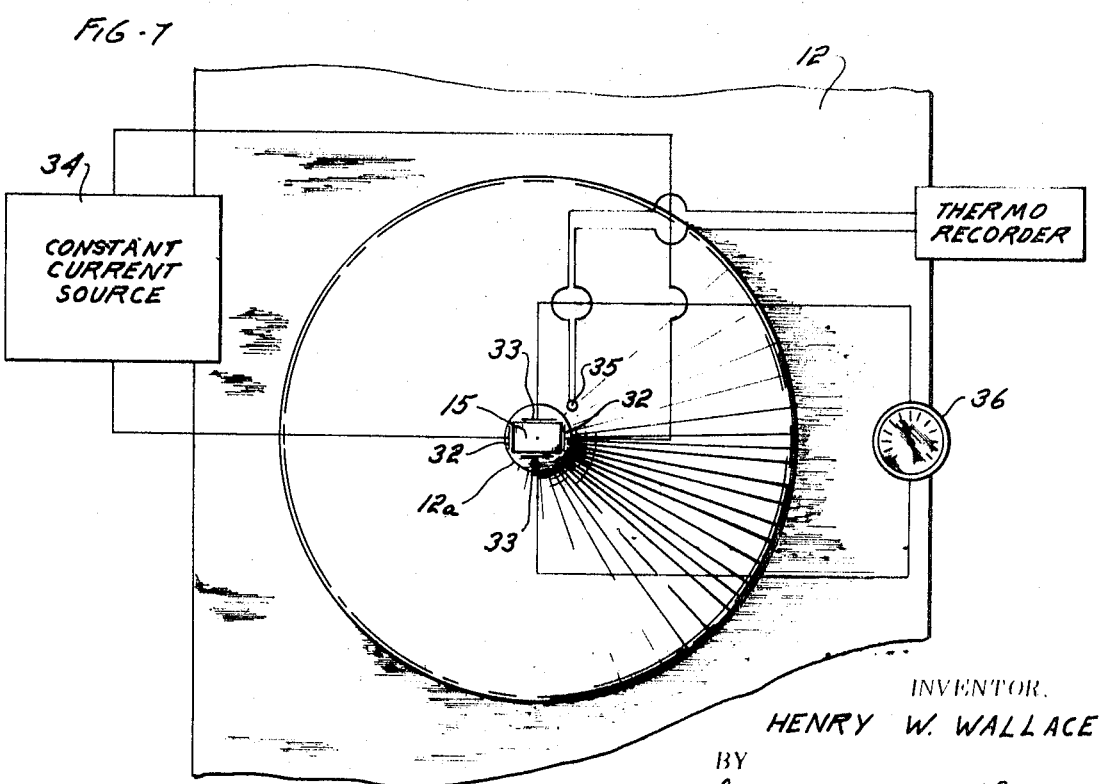
FIG. 7 is a sectional view of FIG. 6 showing associated control and monitoring equipment.

Before proceeding with an explanation of the operation of the generator assembly with respect to the apparatus of FIG. 1, reference is made to FIGS. 6 and 7 which disclose an enlarged view of the detector 15. The lower and upper mass members 12 and 13 are given a conical configuration so as to maximize kinemassic field densities in the area of the working air gap, within which the detector is positioned. FIG. 7 represents a sectional view taken across the working air gap, showing the projection of the conical section of the upper mass member upon the conical section of the lower mass member. Although symmetrical in shape, the projection of the conical surface of the upper mass member onto the corresponding surface of the lower mass member has been slightly reduced for purposes of illustration. In the subject apparatus the two conical brass pole faces 12a and 13a form a working air gap measuring 0.114 centimeter across. Each disc shape pole face measures 0.71 square centimeter in area.

The detector or probe 15 is of indium arsenide and is inserted in the detector air gap with a spacing from either pole face of 0.02 centimeter, the target thickness measuring 0.07 centimeter. Both indium and arsenic process 100% isotope abundance of half integral spin nuclei; arsenic nuclei consists of one isotope of three halves proton spin, while indium nuclei are of two isotopes, both being of nine-halves proton spin.

A second probe of similar semi-conductor material 15a is shown in FIG. 6 as being positioned in close proximity to the first detector. Both probes 15 and 15a are shown mounted on a boom 15b which is shock mounted by means not shown. Shock mounting of the components is important due to the relatively close spacing between the probe and conical pole faces. Lateral displacement of the second probe from the vicinity of the working air gap measured as 25 centimeters.

Although not critical to the overall theory of the present invention, the selection of a semi-conductor probe of the nature heretofore described and the effective results realized through the positioning of the probe 15 and the associated probe 15a with respect to the working air gap between the conical pole faces as well as the manner in which signals measured by the two probes is correlated, are important to an understanding of the forces involved. In this respect it is important to realize that the first and second semi-conductor probes were differentially connected in terms of electrical output and are polarity-sensitive to magnetic field measurements. Together the two probes constitute a differential magnetic probe for an FW Bell Gaussmeter. As conventionally used, such probes provide a measure of the magnetic field intensity from both AC and DC sources, via the Hall effect. The Hall effect is a well known phenomenon whereby a potential gradient is developed in a direction transverse to the direction of current flow within a conductor when the conductor is positioned in a magnetic field. It should be clearly understood, however, that no magnetic field phenomenon is associated with the present invention. Thus the lateral voltages which are measured in the present arrangement are not Hall voltages. This statement is substantiated by the explanation which follows, clearly establishing the absence of any Hall voltage indicative of magnetic fields. In this respect, the two probes are differentially connected for magnetic field measurements to eliminate errors due to ambient magnetic field changes whereas they are additively connected for sensing changes in thermal vibration of crystal lattices. Although polarity-sensitive to the magnetic field, the differential magnetic probe is not polarity-sensitive to changes in thermal vibration of crystal lattices.

The fact that the probes are polarity-sensitive with respect to magnetic field but not with respect to the direction of crystal lattice vibrations means that when the probes are reversed with respect to polarity any discernible difference in the output readings might be attributed to a magnetic field induced into the system by the rotating wheel. Inasmuch as the field conductive portions of the apparatus are comprised predominately of brass which is a paramagnetic material, no appreciable magnetic field should be detected. This in fact corresponds to the actual results in that no measurable difference in magnetic flux was recorded when the polarity of the probes was changed. It is thus possible to realistically discount magnetic fields as influencing operating results.

As seen in FIG. 7, the detector 15 has associated therewith two pairs of contacts 32 and 33, the first of which represents current contacts connected in turn to a source of constant current 34 of conventional design. The second set of contacts 33 are voltage contacts connected to detect any potential gradient transverse to the direction of current flow within the detector. The meter 36 represents means for detecting such potential differences and may be in the form of a very sensitive galvanometer.

A thermocouple 35 is positioned in close proximity to the detector 15 to monitor the temperature thereof. Temperature differences, as recorded by the thermocouple 35, are used for purposes of providing correction figures to the test results. A similar thermocouple is used in conjunction with the second detector 15a, as well as with the upper mass member particularly in the area of the generator wheel. Thermocouples are used for temperature monitoring since the energy change of their conducting electrons, by which they sense temperature change, are not measurably affected by the kinemassic field.

Proceeding now to an explanation of the operation of the subject invention, it will be appreciated that in accordance with the theory of operation of the present apparatus when the generator wheel is made to spin at rates upwards of 10 or 20 thousand revolutions per minute, effective polarization of spin nuclei within the wheel structure gradually occurs. This polarization gradually gives rise to domain-like structures which continue to grow so as to extend their field dipole moment across the interface separating the rim 21 from the pole pieces 23. Secondary dynamic interactions of gravitational coupling between respective dipoles increase the field flux lines around the apparatus field circuit, thus resulting in ever increasing total nuclear polarization of half integral spin nuclei.

The non-electromagnetic forces so generated within the subject apparatus are directed to the working air gap within which is positioned the semi-conductor probe 15. Therein the kinemassic forces are constructively used to reduce the vibrational degrees of freedom of the crystal lattice structure of the semi-conductor probe resulting in a change of its electrical conductivity property. More specifically, the kinemassic field, due to the dynamic interaction of the gravitational coupling of the mass components of the wheel in relation to the stationary portions of the pole pieces in immediate proximity therewith, is restricted to the relatively high permeability material comprising the lower and upper mass members, and is concentrated at the working air gap by means of the conical pole pieces. Inserted in the air gap is the probe of semi-conductor spin nuclei material.

Control circuitry connected to two of the four contacts on the semi-conductor probe 15 is designed to maintain a constant current flow across these contacts. At the same time the ambient temperature of the area surrounding the equipment is permitted to increase. In fact the increase in ambient temperature is initiated well in advance of the initiation of rotation of the generator wheel giving rise to the non-electromagnetic kinemassic force field. The constant increase in temperature is meant to mask out otherwise positive and negative temperature variations resulting in a reduced signal-to-noise ratio of measurement.

In light of the gradual and constant increase in temperature of both the equipment and ambient conditions surrounding the equipment, it might be expected that the thermal vibrations of crystal lattice of the semi-conductor probe would likewise increase. In actuality, a measurable decrease in crystal lattice vibrations is detected within the semi-conductor probe. The actual measurements recorded are in terms of nanovolts of meter movement, and correspond to a decrease in lateral voltages measured across the semi-conductor probe. These values can only be accounted for by an effective polarization of the spin nuclei of the lattice structure due to the polarizing effects of the applied kinemassic force field. The polarization results in a change in the specific heat property of the crystal material, which in turn reflects itself as an increase in electrical conductivity measurable by the galvanometer.

Figure 8:
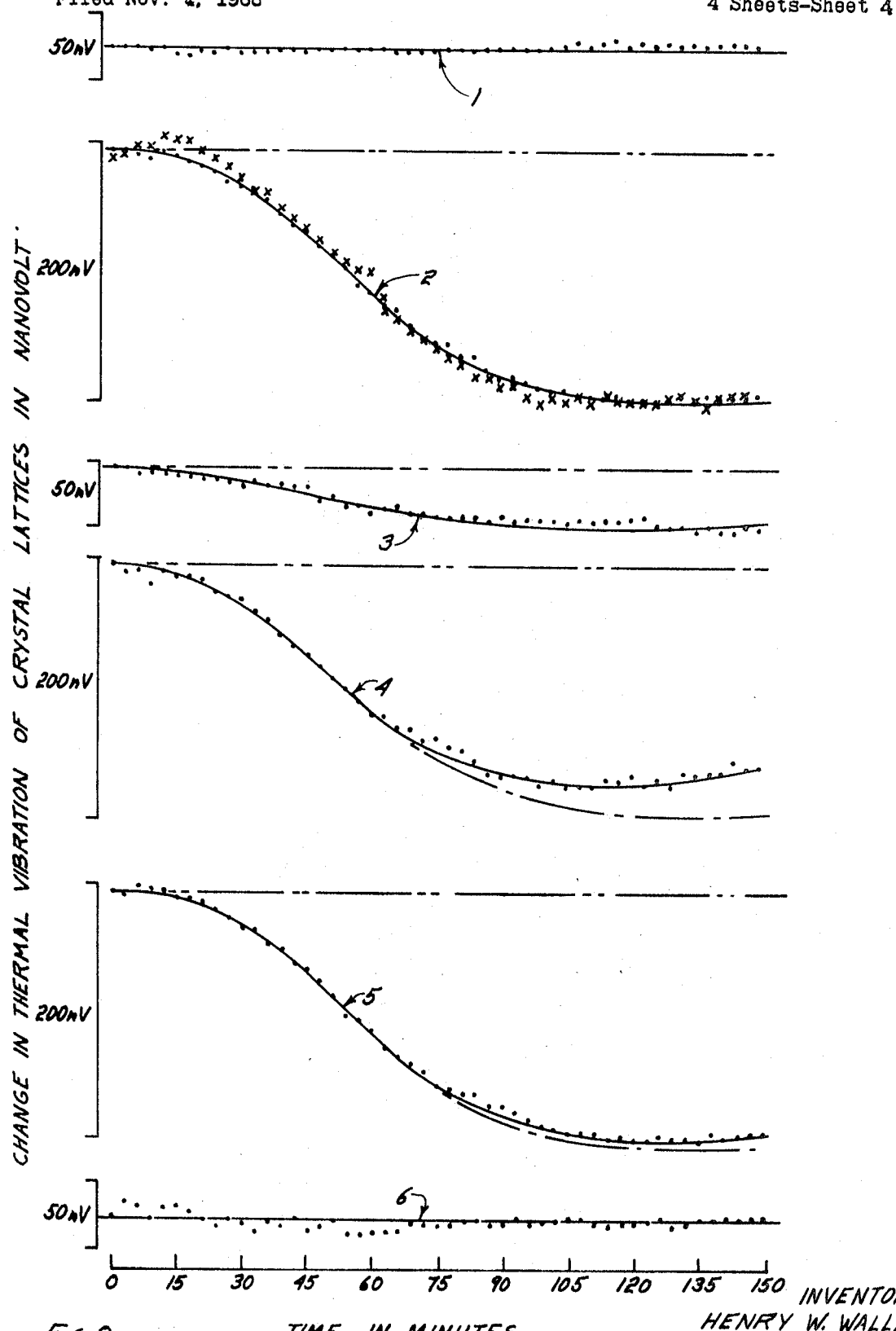
FIG. 8 represents measured changes in the operating characteristics of a crystalline target subject to a kinemassic force field generated in the apparatus of FIGS. 1 and 2.

Reference is now made to FIG. 8 which discloses in graphical relationship the results achieved by various test arrangements of the semi-conductor probe with respect to the subject apparatus.

In the interpretation of the graphical relationships of FIG. 8 it should be understood that corrections for temperature variations have already been applied. These temperature corrections account for the heat applied to the system, that generated within the apparatus due to frictional heating, as well as that due to the change in specific heat property of the apparatus principally the brass members due to their relative bulk. The latter component represents a positive contribution to the ambient temperature due to the decrease in degrees of freedom of the crystal lattice structure of the spin nuclei material when subjected to the kinemassic force field. The above mentioned heat factors result in the increased temperature of the brass members of the apparatus; these increases being monitored by way of the thermocouples positioned in proximity to the kinemassic field generating apparatus, member 35 of FIG. 7 being an example thereof.

Curve 1 of FIG. 8 represents a static test conducted over a period of 150 minutes, values being recorded at 3 minute intervals which was standard procedure for the entire test series. Information gathered in respect to curve 1 was useful in determining compensating factors for ambient temperature changes. In curve 1 as well as each of the other curves of FIG. 8, the ordinate values measure a level of thermal vibration, in nanovolts of meter movement, of InAs lattice structure against time in which ambient temperature change of the two probes has been quantitatively compensated.

Curve 2 represents a portion of a standard test run, the portion shown being the active portion of the curve, i.e., that portion of the curve for which measurable results were recorded due to the spinning of the generator wheel. Not included in curve 2 are measurements taken during a 78 minute preenergizing thermal calibration period typical of the initial portion of each test run conducted. The pre-energizing thermal calibration period is effected in order to illustrate the ambient temperature compensation of the probes and as such is similar to that of the static test of curve 1.

The first 45 minutes of the indicated 150 minute test period of curve 2 represents the time during which the wheel was made to spin at a rate of 28,000 r.p.m. The continuity of the negatively sloping curve prior to, during and following the time interval of the wheel returning to its no spin state, and somewhat subsequently (an indication of a return toward thermal equilibrium percentage distribution of spin angular moment) is consistent with the explanation advanced above concerning the force field generated due to the dynamic interaction of relatively moving bodies. It should be noted with respect to curve 2 that separate test runs conducted some six weeks apart tend to corroborate the independent test results. The results of the two separate tests are superimposed in curve 2. These two tests, in addition to being spaced in time, were spaced many test runs apart. The two test results further establish the repeatibility of the operation.

The change in thermal vibration of the InAs crystal lattice for the test run of curve 2 is approximately equivalent to an 11° centigrade reduction in probe temperature. This figure has been substantiated by computer studies. The computer has also been used to statistically analyze the test data and establish the probability of error in terms of the information recorded. In this respect the results of the computerized study indicate a probability of error of 1 in 1 billion. Since any ratio in excess of 1 in 20 eliminates the probability of chance occurrence, the results obtained in the present instance should be above reproach.

In order to substantiate the distance dependency of the gravitational coupling force due to the dynamic interaction of relatively moving bodies it was predicted that increasing the separation between the generator rim flange 21a and the cooperating surface of the pole pieces 23a should measurably reduce the results obtained. The results obtained when this separation was increased to 0.006 centimeters appears in curve 3. A comparison of these results with those of curve 2 seemingly substantiates the conclusion that upon widening the gap a lessening of the dynamic interaction due to gravitational coupling between the spinning wheel and the stationary pole piece actually occurs.

The data of curve 4 was taken with the air gap separation of the wheel to pole piece established at 0.001 centimeter as in the arrangement of curve 2; however, the duration of wheel spin was decreased from 45 minutes to 30 minutes. Curve 2 results are shown superimposed on the solid line of curve 4. The relative magnitudes of curves 2 and 4, when so contrasted with their respective wheel spin periods, would appear to indicate a degree of half integral spin nuclei polarization saturation.

Curve 5 depicts the results achieved by way of a shunt test wherein two lead bars were secured to the stationary brass bodies of the generator assembly so as to measure the effect of shunting the field at zones of maximum field potential. As contrasted with the results of curve 2, superimposed thereon, a statistically as well as visually significant difference is associated with the experimental results which, realistically, may be attributed to the shunting effect. The statistical study mentioned above, substantiates the distinguishable nature of the data groups resulting in curves 2 and 5.

Curve 6 depicts the results of a test run in which the field permeability has been eliminated by removal from the test apparatus of the upper mass member and the two detector conical pole faces. The lower mass member has also been adjusted downward so as to rest on the horizontal structural element 10. At the same time the spatial relationship between the generator assembly and the two differentially connected probes was not altered. As may be observed from the curve 6, there occurred no change in thermal vibration of the InAs crystal lattice. The plot scatter observable during the 45 minutes wheel spin period is attributable to increased temperature gradients which developed between the probes and the respective thermocouples in the absence of the various field circuit member thermal masses.

Further experimental results are available to substantiate the heretofore stated conclusions concerning the operating characteristics of the subject apparatus. In this respect reference is made to the copending application of the present inventor entitled Method and Apparatus For Generating a Secondary Gravitational Force Field, filed Nov. 4, 1968 and bearing Ser. No. 773,051, the subject of which concerns an apparatus for establishing a time variant kinemassic force field.

It will be apparent from the foregoing description that there has been provided an apparatus for generating and transforming kinemassic forces due to a dynamic interaction field arising through gravitational coupling of relatively moving bodies. Although in its original application the kinemassic force has been applid to the reduction of thermal vibrations in the lattice structure of a crystal, it should be readily apparent that other more significant uses of these forces are contemplated. In this respect the principles of the present invention may well be applied to any system in which bodies are nonresponsive or only partially responsive to conventional forces such as electromagnetic force fields. Thus, the present invention should have particular applicability to the stabilization of plasma particles, pursuant to controlled thermal nuclear fusion, or in the governing of temperatures and thermal energies within matter.

While in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and for which it is desired to secure Letters Patent is:

1. An energy generating and transforming apparatus comprising a first member, said first member further comprised of spin nuclei material and mounted so as to be freely rotatable about an axis located within said first member, at least one stationary member, said stationary member comprised of spin nuclei material and positioned immediately adjacent said first member, and means for effecting the rotation of said first member whereby it is effective in impressing a non-electromagnetic force onto said stationary member.

2. A method for generating a non-electromagnetic force field and for converting such force field into useful work comprising the steps of mounting a first member comprised of preferred material in a manner which enables said first member to assume a degree of relative motion with respect to a second member also comprised of preferred material, establishing a degree of relative motion between said first and said second members, and sensing the resultant energy due to the dynamic interaction of the relatively moving members.

3. The method of claim 2 wherein the sensing further comprises the steps of positioning a member of preferred material within said non-electromagnetic force field and measuring the change in the physical characteristics thereof.

4. An apparatus comprising two U-shaped members of spin nuclei material, non-spin nuclei material means for positioning said U-shaped members in mirrored relationship with one another and separated by two gaps, means including a freely rotatable member of spin nuclei material mounted in one of said two gaps, means including a detector mounted in the other one of said two gaps, and means for effecting the rotation of said freely rotatable member whereby a non-electromagnetic force is impressed upon said detector.

5. The apparatus of claim 4 wherein the detector positioned within the second of said two gaps comprises a crystalline structure of spin nuclei material such that the non-electromagnetic force impressed upon said crystalline structure is effective in polarizing said spin nuclei material sufficiently to reduce the specific heat properties of the crystalline structure so as to effect a substantial increase in the temperature thereof.

6. An energy generating apparatus comprising a first member, a second member, and means for establishing relative motion between said first and second members whereby a non-electromagnetic force is generated within said first and second members due to the dynamic interaction of said relatively moving members.

7. An energy generating and transforming apparatus comprising a mass circuit constructed of spin nuclei material of half integral spin value, said mass circuit having two gaps therein, field generating means rotatably mounted in one of said mass circuit gaps, said field generator means further comprising a frame for rotatably mounting thereon a member comprising spin nuclei material of half integral spin value, the axis of rotation of said rotatable member lying in the plane of said mass circuit, a pair of pole pieces mounted on said frame, said pole pieces being disposed on said frame on opposite sides of said rotatable member, each pole piece presenting a generally circular face in close proximity to but spaced from a face of said rotatable member, said pole pieces being further configured to substantially fill the gap in said mass circuit, means for rotating the rotatable member of said field generator means at high velocity, and means mounted in the other gap of said mass circuit for detecting a field in said circuit.

8. An energy generating and transforming apparatus comprising: a mass circuit of dense material, and having two gaps therein, mounting means for said mass circuit, said mounting means having restricted contact area with said mass circuit, field generator means rotatably mounted in one of said mass circuit gaps; said generator means further comprising a frame, a rotatable member mounted on said frame for rotation, the axis of rotation of said rotatable member lying in the plane of said mass circuit throughout all relative positions of said frame, a pair of pole pieces mounted on said frame by mounting means establishing restricted contact area between each pole piece and said frame, said pole pieces being disposed on said frame on opposite sides of said rotatable member, each pole piece presenting a generally circular face in close proximity to but spaced from a face of said rotatable member, said pole pieces being further configured to substantially fill the gap in said mass circuit, means for rotating the rotatable member of said generator means at high velocity, and means mounted in the other gap of said mass circuit for demonstrating a change in physical characteristics within said gap region due to the field generated within said mass circuit.

9. The apparatus of claim 8, wherein said means mounted in the other gap of said mass circuit comprises a member whose atomic structure is such that it is affected by said field generated within said mass circuit.

10. A method for controlling the temperature in a crystalline structure by subjecting the crystalline structure to non-electromagnetic forces capable of altering the specific heat properties thereof, including the steps of: connecting in field series relation a mass circuit constructed of dense spin nuclei material of half integral spin value, a field generator constructed essentially of spin nuclei material having a half integral spin value and rotatably mounted in one of said mass circuit gaps, and a crystalline structure also of spin nuclei material having a half integral spin value positioned in the other of said mass circuit gaps; initiating the rotation of said field generator whereby the external angular momentum of spin nuclei material within said rotating field generator interacts with inertial space to effect the polarization of the spin nuclei thereof, resulting in turn in a net component of angular momentum which dynamically interacts with the spin nuclei material of the mass circuit thereby further polarizing the nuclei of the material therein; and concentrating the resultant field within said field series circuit onto said crystalline structure within the second of said mass circuit gaps whereby the spin nuclei material of said crystalline structure is sufficiently polarized to reduce the specific heat properties of the crystalline structure due to a reduction in degrees of freedom of the lattice vibrations of said crystalline structure thereby effecting a substantial temperature increase in the body thereof.

No references cited.

HARLAND S. SKOGQUIST, Primary Examiner

UNITED STATES PATENT OFFICE
CERTIFICATE OF CORRECTION

Patent No. 3,626,606　　　　　Dated December 14, 1971

Inventor(s) Henry W. Wallace

It is certified that error appears in the above-identified patent and that said Letters Patent are hereby corrected as shown below:

IN THE SPECIFICATION

Column 2, line 10, "According should read --Accordingly--.

Column 2, line 25, "purposes" should read --proposes--.

Column 2, line 51, "spection" should read --specification--.

Column 4, line 32, "geld" should read --field--.

Column 7, line 56, "process" should read --possess--.

Column 11, line 34, "applid" should read --applied--.

Signed and sealed this 4th day of July 1972.

(SEAL)
Attest:

EDWARD M. FLETCHER, JR.　　　　　ROBERT GOTTSCHALK
Attesting Officer　　　　　　　　Commissioner of Patents